May 25, 1954

A. WEXLER 2,679,642

LIQUID LEVEL INDICATOR

Filed June 23, 1951

WITNESSES:
Robert C. Baird
E. F. Oberheim

INVENTOR
Aaron Wexler.
BY
Paul E. Friedemann
ATTORNEY

Patented May 25, 1954

2,679,642

UNITED STATES PATENT OFFICE 2,679,642

LIQUID LEVEL INDICATOR

Aaron Wexler, Pittsburgh, Pa., assignor to Westinghouse Electric Corporation, East Pittsburgh, Pa., a corporation of Pennsylvania Application June 23, 1951, Serial No. 233,195

3 Claims. (Cl. 340—247)

This invention relates generally to electric gauges and more in particular to gauges of the type which are useful in indicating the level of liquids in containers.

More in particular this invention relates to an electric gauge for liquid level measurement which embodies a wire filament of a material capable of carrying a predetermined electric current and adapted for immersion, at least in part, in a liquid the level of which is to be measured, the wire filament having a sufficiently large temperature coefficient of resistivity that the resistance of the wire in the liquid is different from that in the atmosphere or vapor above the liquid for the given current. The resulting voltage difference therefore forms a basis for ascertaining the level of the liquid.

In connection with the determination of liquid level of low boiling point liquids, there are four general methods which have been utilized. The most direct method involves the weighing of the container. This method is clearly not applicable when the container is rigidly mounted as may frequently be the case nor is it a practical expedient when the ratio of the weight of the container to the weight of the liquid is large as is usually the case when such liquids as hydrogen and helium. Further, when the internal geometry of the container is not simple, an indication of the level of the liquid is frequently more useful than one of the total contents.

Another method is based on the measurement of the hydrostatic head exerted by the liquid. This usually requires the use of draft gauges which are easily upset by pressure surges within the container, resulting in transient pressure differences many times greater than that exerted by the liquid.

A third method is based on the fact that the temperature of the vapor above the liquid may be higher than that of the liquid. Gauges based on this principle, however, are not usually capable of reproducing indications because normally the temperature difference is small and variable for a variety of reasons.

The fourth method is based on the fact that the heat transfer from a body to a boiling liquid is better than that between a body and the vapor above the liquid. Advantage is taken of this principle in electric gauge arrangements in which there are a number of thermocouples with heaters mounted at various levels in a container. The output voltage of a given thermocouple is significantly different, depending upon whether it is immersed in the liquid or is in the vapor.

This type of gauge works satisfactorily but is complex in structure requiring relatively sensitive indicating instruments. A further disadvantage of the thermocouple system is that the surface of the unit to be heated is relatively large and, therefore, relatively large amounts of power are required for increasing its temperature sufficiently to give a positive indication.

One object of this invention is to provide a liquid level gauge which is simple in its elements and positive in operation.

A further object of this invention is to provide an electric gauge embodying an element to be at least partly submerged in the liquid, the level of which is to be measured, in which advantage is taken of the fact that the heat transfer between that portion of the element immersed in the liquid and the liquid is better than the heat transfer between the element and the vapor above the liquid.

More specifically stated, it is an object of this invention to provide an electric gauge embodying a strand of metal having a temperature coefficient of resistivity, which strand of metal is adapted to be immersed at least in part in the liquid, the level of which is to be measured and to have a current passed therethrough, whereby the voltage variation of said strand may be utilized as an indication of the level of the liquid.

The foregoing statements are merely illustrative of various aims and objects of this invention. Other objects and advantages will become apparent from a study of the following specification when considered in conjunction with the accompanying drawings, in which.

Figure 1:
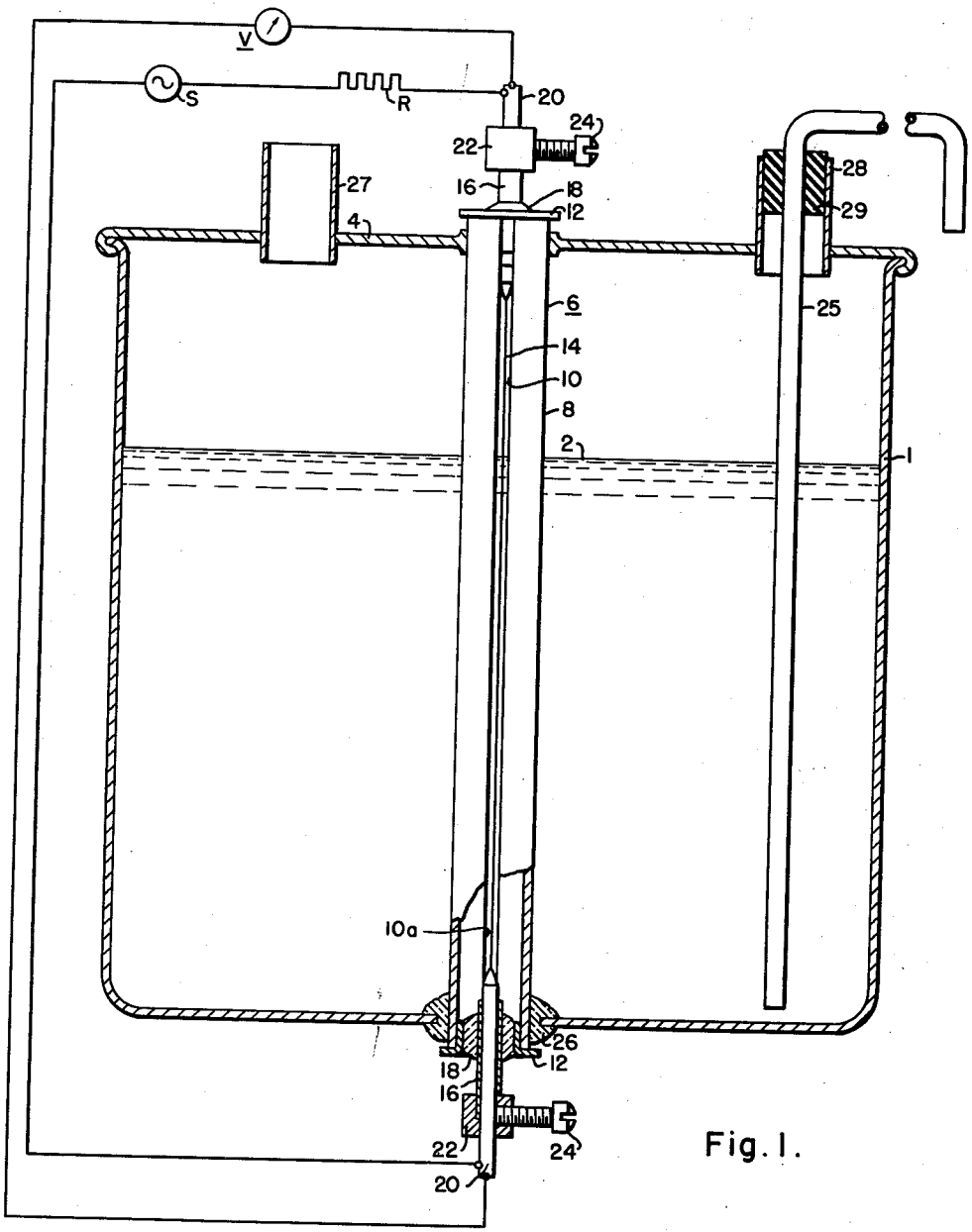
Fig. 1 is a view fragmentarily in section of one embodiment of this invention.

The assembly illustrated in Fig. 1 includes a container 1 which is partly filled with a liquid 2. This container is sealed by means of a cover 4. The use of the cover 4 is not essential to this invention, but serves in part to support the upper extremity of a liquid level gauge assembly 6, which is supported within the container. The use of the cover will depend largely upon whether or not contamination of the fluid can be tolerated and upon whether or not it is desired to insulate as much as possible the contents of the container from room temperature. In the application of this invention to low boiling point liquids, it will be appreciated that more elaborate precautions than those illustrated in Fig. 1 (see Fig. 3) will ordinarily be taken to minimize heat transfer between the room atmosphere and the liquid within the container. The bottom portion of the liquid level gauge assembly 6 extends through the bottom of the container.

The liquid level gauge is comprised of a split tubular section 8 which is longitudinally split in diametrically opposite positions. One longitudinal opening is designated 10 and the other is designated 10a. The split tubular section is secured at each of its extremities, as by soldering, to form a liquid-tight joint, to short sleeves 12 which are outwardly flanged adjacent the extremities of the split tubular sections. This assembly of split tubular sections forms a housing for the sensitive element 14 of the gauge, which element is a fine strand of metal. Such a strand of metal, for example, may be a fine wire of pure platinum having a diameter of about $1/1000$ of an inch.

Sleeves 16 are concentrically disposed within the short sleeves 12 at each end of the split housing and are secured therein by a glass-to-metal seal 18 at each end of the housing. The glass-to-metal seal 18 in addition to providing a secure and liquid-tight support for the sleeves 16 also serves to electrically insulate the sleeves from the split housing 8. Terminals or electrodes 20 are respectively slidably fitted through the sleeves 16 in each end of the housing and protrude from the inner ends of the sleeves into the housing the strand 14 being spot welded to the tips of the terminals to have good electrical contact therewith and to be supported thereby.

Each sleeve is fitted with a tapped block 22 at its outer extremity through which each of the electrodes 20 protrudes. Set screws 24 threaded through the side of each of the tapped blocks engage the terminals 20 and secure these terminals in their proper positions. The bottom end of the liquid level gauge assembly which protrudes through the bottom of the container 1 is sealed thereto to form a liquid-tight joint by means of a glass-to-metal seal 28. This seal is sufficiently strong to support the gauge assembly in the container, in addition to forming the fluid-tight joint previously mentioned. Leakage of fluid through sleeve 16 around electrode 20 at the bottom of the container may be obviated by soldering the bottom electrode in its sleeve.

The strand 14 as previously noted is of a pure metal. Most pure metals have positive temperature coefficients of resistivity. The resistance of the wire or the voltage drop across it for a given current will be markedly greater when it is in the vapor than when it is in the liquid. Furthermore, in the case of a fine wire, along which thermal conduction may be neglected in comparison with the total power generated, the resistance or voltage drop is essentially a linear function of the liquid level. In one practical application, a fine wire of $1/1000$ of an inch diameter platinum was employed. However, a metal such as tungsten and other pure metals may also be employed for this purpose.

In the application of this embodiment of the present invention to the measurement of the level of low boiling point liquids, the metal selected is preferably one which does not become superconductive at temperatures at which the gauge will operate. Otherwise, there will be no possibility of producing Joule heat on which the operation of the gauge depends.

Provision for filling and emptying the container is afforded by the tube 25 secured by the bushing 26 in tube 28 which, in turn, is secured in the cover. Tube 25 is of U-shaped configuration having an extended section terminating adjacent the bottom of the container. For filling the container, the liquid supply is applied to the external end of the tube 25 and the container is vented through a tube 27 mounted in the cover 4. For emptying the container, a supply of gas under suitable pressure is applied to tube 27 forcing the liquid contents through the tube 25. If liquid 2 is a low boiling point liquid, the source of gas pressure is usually the gaseous form of the liquid to minimize liquid contamination.

Various types of electric circuits may be utilized in connection with the gauge herein illustrated. Such circuits, depending upon the degree of accuracy desired, may be arranged to compensate various unwanted variables resulting from external or internal conditions. For example, ambient temperature variations, an external condition, may disturb the calibration. The sensitivity of the gauge assembly 6 to ambient temperature is minimized to a large extent by provision of the metallic housing. In a practical embodiment of this invention, this housing is made of copper and substantially guarantees that the ambient temperature as far as the strands of wire 14 is concerned, remains constant irrespective of the liquid level height.

A simple circuit for energizing the electric gauge is illustrated in Fig. 1 and includes a source of electrical energy S herein designated as a source of alternating current. However, it is to be appreciated that direct current may also be employed. The source is connected in series with a current limiting resistor R across the terminals 20 of the liquid level gauge. The value of resistor R depends on the extent to which it is to be current limiting. In most cases it is of such a value as to maintain the current through the gauge element constant, irrespective of its resistance.

Upon the application of voltage to the terminals 20 by the source, a current is caused to flow through the series circuit including the resistance R and the strand of wire 14. This current is selected of sufficient magnitude to cause the wire 14 to become heated. It will be appreciated that the portion of the wire which is out of the liquid 2 will be appreciably warmer than that which is immersed in the liquid 2 and, further, that as the liquid level falls due to removal thereof through some suitable means such as tube 25, that less of the wire will be in the liquid and more of the wire will be in the vapor above the liquid. As a consequence for the assumed electrical properties of the strand, the voltage drop across the wire 14 will increase due to the fact that a greater portion of the wire is presently at a higher temperature than for the previously considered case in which the liquid level was higher. This increase in voltage, as earlier noted, is essentially a linear function the liquid level and as a consequence, the change in voltage across the gauge element is an indication of the variation in liquid level and may be conveniently measured by means of a volt meter such as V connected across terminals 20 and having a suitably calibrated scale. The meter circuit conductors to terminals 20 are preferably separate from the energizing circuit conductors, as shown. This expedient minimizes or eliminates instrument circuit response to voltages other than those across the strand or filament 14. For example, this expedient eliminates from the instrument circuit the voltage drop along the energizing conductors due to the flow of energizing current therein.

It should be noted at this point that other types of circuits may be employed in accordance with conventional practice in the metering art. For example, the electric gauge may be connected as one leg of a bridge circuit, in which case the unbalance voltage across the bridge circuit is an indication of liquid level and in connection with the use of a bridge circuit, various conventional expedients may be utilized to minimize effects of unwanted variables in the metering system. However, for most applications the simple basic circuit herein illustrated will probably be sufficient.

In actual tests which have been made with an electric gauge according to this invention and with a platinum wire of 1/1000 of an inch diameter and 14 centimeters in length, it was found that a current of .17 ampere was a good operating current for liquid nitrogen, since the resistance of the wire was five times as large in the vapor as in the liquid. For these conditions, the linearity of the gauge is good and the voltage swing across the gauge at constant current varies between 1.2 volts and 5.3 volts. Additionally, the gauge indications of liquid level are entirely reproducible over the complete range. For liquid helium, .425 ampere is known to be a good operating current.

For a given temperature rise of the wire in the vapor, the following relationships give the dependence of current voltage and power on the radius of the wire:

$$i \sim r^{3/2}, \; V \sim r^{-1/2}, \text{ and } P \sim r$$

In the second embodiment of this invention, principles analogous to those utilized in the previously described embodiment are employed. The physical arrangement, however, is somewhat different. The arrangement being in the form of a dip stick, generally designated 40 which is adapted for insertion into a container such as the container 42 illustrated in Fig. 2. The dip stick is provided with a head 44 of electrical insulating material within which the fine strand of wire is supported. As will be seen by reference to Fig. 2, the end of the head 44 is partly immersed in the liquid, generally designated 46.

Figure 2:
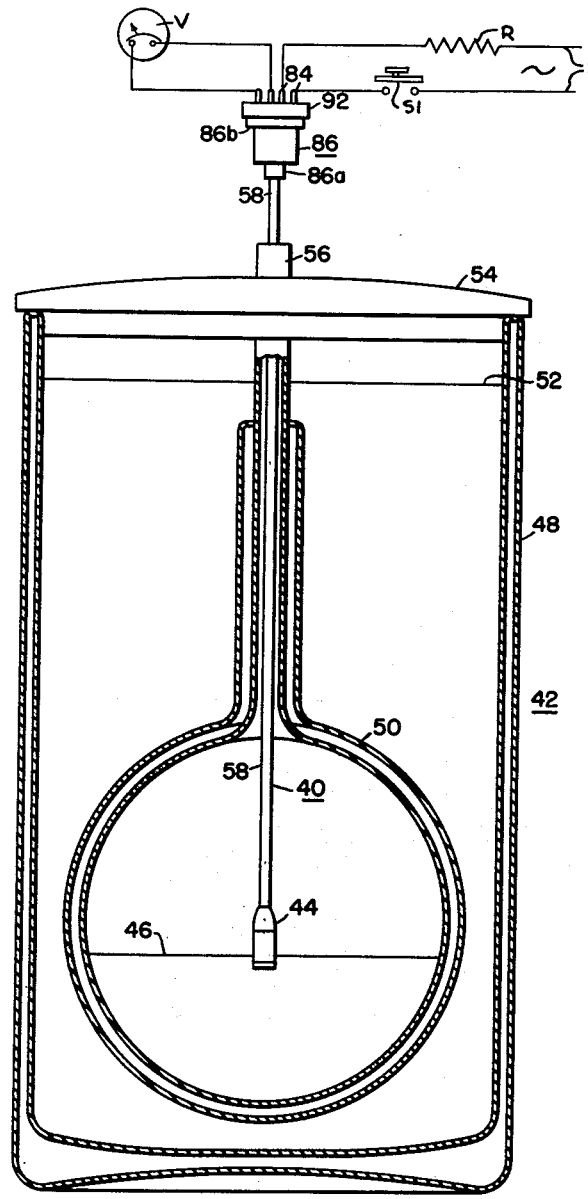
Fig. 2 is a sectional view illustrating the application of a second embodiment of this invention.

The container of the type illustrated in Fig. 2 is frequently employed in storing liquid helium. Such a container includes an outer vacuum jacket assembly 48 within which is positioned a vacuum jacket flask 50 in which the liquid helium is stored. The container section 48 is filled with a low boiling point liquid such as liquid nitrogen to a level indicated by the liquid level line 52 which extends an appreciable distance up the neck of the flask above the surface of the liquid helium 46 within the flask. The outer container shell 48 is closed over by means of a cover 54 which is provided with a hole therethrough (not shown) through which the neck 56 of the flask 50 protrudes.

Figure 3:
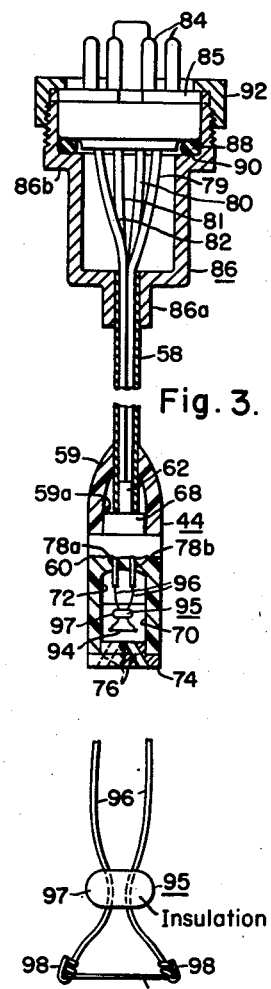
Fig. 3 is an enlarged fragmentary sectional view of the second embodiment of this invention.

The details of this embodiment of the invention are illustrated in Fig. 3. This device may be referred to as an electrical dip stick and is comprised of a main body portion of the form of a thin-walled tube 58 which is of sufficient length as shown in Fig. 2 to extend the full length of the neck of a flask, such as 50, into the flask so that the head 44 of the device may be positioned beneath the level of the liquid helium in the flask. This thin-walled tube is preferably of a material of low thermal conductivity.

To the bottom end of the thin-walled tube 58, the head 44 is secured. This head is comprised of three separate sections of electrical insulating material. One section 60, which is the main body portion, is provided with a pair of reduced diameter sections 62 and 68. Section 62 is press-fitted into the lower end of the thin-walled tube 58 until it abuts the shoulder formed by the larger diameter section 68. This main body portion 60 is essentially circular in cross-section and is provided with a cylindrical cavity 70 which opens through the bottom thereof. Diametrically disposed openings 72 extend through the side walls of body portion 60 at points adjacent the uppermost end of the cavity as viewed. The open end of this cavity is closed by means of a cap 74 which is press-fitted therein and which is provided with a pair of drain holes 76 in order to drain liquid. A bullet-shaped cap 59 having an outer diameter corresponding to that of body portion 60 and shaped internally to slidably fit over thin-walled tube 58 and seat upon the shoulder formed by section 68, is secured in position against the mentioned shoulder by means of a pin 59a secured in body portion 60 and projecting into the inner wall of cap 59. This cap assures smooth withdrawal of the gauge head from the flask in which it is inserted through the neck of such flask.

Two short sections of brass capillary tubing 78a and 78b are fitted into the the main body portion 60 and extend longitudinally thereof through the main body portion on one end into the cavity 70 and on the other end, through the reduced diameter section 62 into the thin-walled tube 58. The upper ends of tubes 78a and 78b are connected to a plurality of conductors 79, 80, 81 and 82 which extend through the full length of the thin-walled tube 58. Although the details of these connections are not shown, it is to be understood that such connections are conventional, the ends of the conductors 79 through 82 being soldered to the tubes or terminals 78a and 78b. Each of the terminals has two of the conductors connected thereto. Thus, the conductors 81 and 82 extend down through the thin-walled tube 58 and connect to the terminal 78a on the left as viewed while the conductors 79 and 80 connect to the terminals 78b on the right as viewed (also see Fig. 5).

The upper ends of the conductors 79 through 82 are each connected into separate terminals of the group of terminals 84 of a standard plug 85. This plug is of a type in which the terminals 84 are sealed in glass internally of the plug, the plug casing being formed of a suitable plastic material. The plug assembly is such that it forms a gas-tight unit and is mounted in a plug housing 86, which is substantially of cylindrical cross-section. A reduced diameter sleeve portion 86a extending from the bottom of plug housing 86 slides over the upper end of the thin-walled tube 58 and is sealed thereto as by soldering to form a gas-tight joint. Plug 85 is fitted into an enlarged portion 86b of the plug housing 86 adjacent the upper end thereof and seats upon a gasket 88 which, in turn, is seated upon a shoulder 90 formed at the base of the enlarged portion. Plug 85 is secured in the plug housing against the gasket 88 by means of a plug retainer ring 92 which is internally threaded and threads over the enlarged portion 86b of the housing. This retainer ring is provided with an inwardly flanged upper extremity which engages the upper surface of plug 85 to apply the seating and securing pressure.

Figure 4:
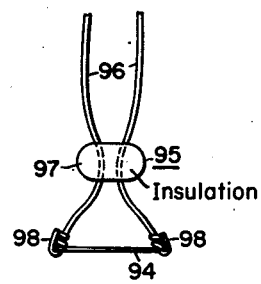
Fig. 4 is a detail of the sensitive element of Fig. 3 drawn to an enlarged scale.

In this embodiment of the invention, the sensitive element 94 may be a ⅛ inch long section of .00005 in. dia. platinum wire soldered to the ends of a two-wire press 95 of the type used in the manufacture of flashlight bulbs. This press comprises two wires 96 which are fused into a ceramic head 97. The ends of the wires 96 on which the wolfram coil is normally mounted in the manufacture of the bulb, are formed into hooks 98 as shown in Fig. 4. In the process of manufacture of these small bulbs, the wires 96 are coated with red phosphorus which acts as a getter when heated.

In manufacturing the temperature sensitive unit, the first step is to bend the ends of the wires 96 to the shape indicated. This may be accomplished with the help of a ⅛ inch square piece of metal so as to provide for a uniform length of the wire 96 beyond the ceramic head. The first 1/16 inch of the ends of wires 96 are treated with a 50% aqueous solution of warm nitric acid to dissolve off the copper. This is done to minimize bubble formation later in the process when bubbles might break the very fine wire element. The wire press is then treated with dilute hydrochloric acid to dissolve the phosphorus. The .00005 in. dia. platinum wire, which is manufactured with a protective coating of silver thereover, is mounted by taking two turns of this sensitive wire element about one of the hooks. The wire is then pulled firmly to a position adjacent the other hook and two turns are wrapped upon the second hook, essentially as shown. The wire is then cut from the supply reel and the hooks 98 are closed with a pair of pliers to form a good mechanical connection at both ends. The sensitive wire element is then treated with a 50% aqueous solution of warm nitric acid to remove the silver jacket. The fine wire is carefully rinsed with water to remove excess acid. Positive electrical connections are made at either end by carefully applying a small amount of 60-40 solder with acid flux. Care is taken to evaporate all the flux in this operation. About 40 elements can be made from one foot of the fine wire with this process.

In this embodiment of the invention, the wires 96 are inserted into the ends of the tubes or terminals 78a and 78b which project into the cavity 72 as shown in Fig. 3. Thereafter, wires 96 and tubular terminals 78a and 78b are securely joined as by soldering.

Figure 5:
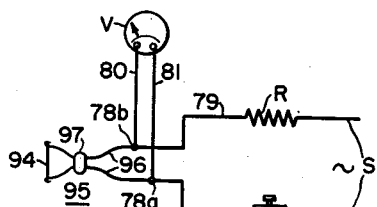
Figs. 5 and 6 are diagrammatic illustrations of circuits applicable to the second embodiments illustrated in Fig. 3.

The circuit which is herein employed is similar to that illustrated in Fig. 1. This circuit is illustrated in Fig. 5. It also appears in Fig. 2. In Fig. 5, the terminals 78a and 78b are represented by the similarly identified junction points in the circuit. A resistance or impedance device designated R is connected in series in the conductor 79 to function as a current limiter, as before, and the circuit is energized by a supply of alternating current generally designated S. Here again, direct current may be employed if desired. With the arrangement illustrated, it will be appreciated that one set of conductors 79 and 82 are provided to conduct the energizing current to the sensitive element 94 and that a separate set of conductors 80 and 81 is provided for taking voltage readings of the voltage across the sensitive element. The voltmeter designated V is connected across the ends of conductors 80 and 81. The object in providing these separate conductors is again to minimize the possibility of reading voltage drops due to the resistance of the conductors carrying the current to and away from the element 94. Thus the measured voltage is primarily indicative of the voltage across the sensitive element 94.

The room temperature resistance of a sensitive element such as 94 is about 120 ohms. The resistance is about 30 ohms at the nitrogen boiling point and about 9 ohms at the helium boiling point. It is found that a good operating current for the liquid nitrogen is .011 ampere giving a fourfold resistance increase when the wire is in the vapor. A good operating current for liquid helium is .020 ampere giving a threefold resistance increase when the wire is in the vapor above the liquid helium. It is to be noted that the power dissipated in the liquid is very low, being of the order of about .004 watt.

The metering and energizing connections, it will be appreciated, are made through the terminals of the plug 85 by the use of a socket, not shown, connected to a meter and to a suitable supply of energizing current. The socket leads should be sufficiently long and flexible to provide ready manipulation of this liquid level measuring device. In practice, once the circuit connections are established, this device may be lowered into a container of the type such as illustrated in Fig. 2. Upon insertion into a flask such as 50, the temperature and the resistance of the sensitive element 94 drop very rapidly until the resistance level of the sensitive element in the vapor is reached. As the measuring device is moved further into the container or flask 50, the head 44 contacts the liquefied gas within the container. When this liquefied gas contacts the sensitive element 94 as explained hereinabove, a marked change in resistance occurs. This change in resistance will be reflected externally as a sudden movement of the pointer of the instrument V. This sudden movement of the pointer then establishes the depth at which contact with the liquid is made. If desired, the thin-walled tube 58 may be suitably calibrated externally to indicate the actual depth of the liquefied gas within the container. A device such as this may also be used as a permanent addition to a liquefied gas container of the type shown. This device may be slidably mounted in the container at some convenient point so that it always remains with the container and may be utilized at any time to indicate the depth of the liquefied gas therein by the simple expedient of connecting the device to the energizing and metering circuit through the plug and socket connections described.

The sensitive elements may also be used in another way. A number of them may be mounted at convenient points where the presence or absence of liquid could be determined. They may be connected in series or otherwise depending upon the application.

Figure 7:
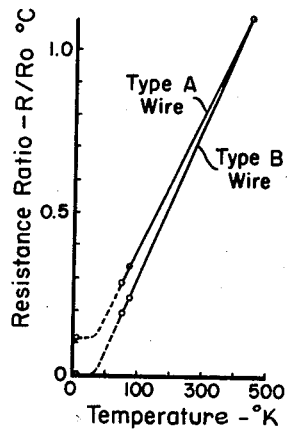
Figs. 7, 8 and 9 graphically illustrate electrical characteristics of two types of sensitive elements embodied in this invention.
Figure 8:
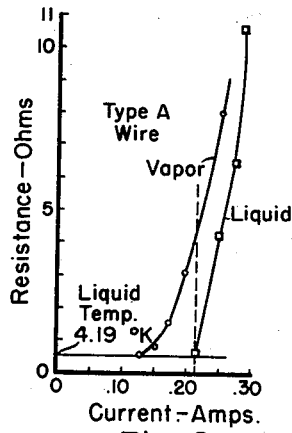

Although the sensitive elements heretofore described have been found to produce robust indications of the presence or absence of the liquid at a particular point, it has been found that gauge elements of wires having low residual resistance ratios produce an even better response to the changing conditions between immersion in the vapor and immersion in the liquid, particularly liquid helium. Referring to Fig. 7, experiments which have been conducted with unannealed .0004 diameter platinum wire (identified as type A in Fig. 7) made by drawing heavier wire through dies, indicates that the resistance is proportional to the absolute temperature over a wide temperature range. This is wire similar to the type hereinabove generally considered, for example, in connection with Fig. 1. This drawn wire for the purposes of this discussion, is identified as type A. In Fig. 7, the curve marked type A depicts the resistance-temperature relation for the wire. At very low temperatures, the resistance becomes independent of temperature. This temperature independent minimum value ($R/R_0°$ C., from the curve, is equal to .112 in this case) is a measure of the total (chemical and physical) impurity content of the metal. The term residual resistance ratio is given to this value. For an ideally pure metal, the residual resistance near absolute zero is zero. In the case of the type of wire presently being discussed, the impurities are mainly chemical, for the residual resistance is decreased by only 14% by vacuum annealing. Fig. 8 illustrates the resistance-current characteristic of the type A wire used as a liquid helium gauge. From the curves it will be noted that at about 0.214 amp. the wire resistance in the vapor is about 4.3 ohms and in the liquid is about 0.44 ohm giving a maximum ratio of wire resistance in the vapor to wire resistance in the liquid of about 10, which diminishes rapidly at current values above and below this level.

Figure 9:
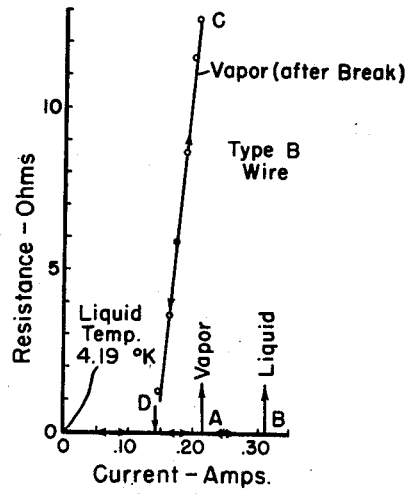

A .0004 diameter wire made by a particular process has characteristics which may be preferred for this application. This wire is annealed at 525° C. for three hours under high vacuum conditions. With such a wire, the residual resistance ratio is .0022 which is less than that for the drawn wire hereinabove considered by a factor of 50 and is identified as type B in Figs. 7 and 9. As shown in Fig. 9, when the annealed wire is immersed in liquid helium at a temperature in the vicinity of its boiling point, the resistance of the wire remains substantially constant at the residual resistance level, until the current passing through it rises to .310 ampere. When the current rises infinitesimally above this value, the resistance skyrockets. If the circuit is not such as to make the resistance of the gauge element current limiting, the platinum wire would fuse. The resistance R provided in the circuit illustrated in Fig. 5 is selected of such a size to introduce the necessary current limiting feature. When the wire is in the vapor in equilibrium with the liquid, the resistance remains virtually constant until the current rises above .215 ampere. Here again the resistance rises by a huge factor.

A suitable value for the operating current of such a gauge is of the order of .250 ampere. If the gauge element is immersed in liquid helium, then the current through it can be adjusted to .250 ampere with only a negligible voltage drop (about .004 volt) appearing across the element.

Figure 6:
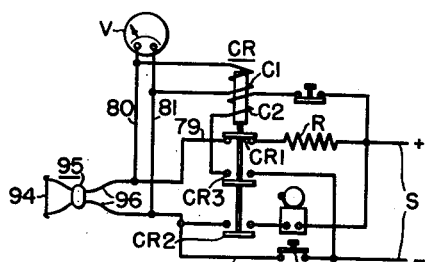

At the moment the element is raised above the liquid, the voltage drop rises to about 2 volts. At this time, in the circuit of Fig. 5, the switch S1 is opened and the unit is again ready to give a liquid level indication. For the purpose of operating convenience, as shown in Fig. 6, the operating coil C1 of a sensitive relay CR may be connected across the gauge, the contacts CR1 opening the energizing circuit and the contacts CR2 being utilized to ring a bell or other audible device when the gauge element is in the vapor. A holding circuit including contacts CR3 and the holding coil C2 of the relay in series therewith, across the source, serves to lock the relay CR out when the gauge is in the vapor. Any other suitable arrangement such as a lockout relay may be employed for this purpose.

All of the other liquid level indicators described hereinbefore behave reversibly in the sense that for a given current the resistance depends only on whether the sensitive element is in the liquid or the vapor and not on its previous history. In the use of the very sensitive elements having low residual resistivities, cognizance must be taken of the irreversibility shown in Fig. 9. Thus the curves show that if such an element is immersed in liquid helium the resistance will remain negligibly small until the current exceeds the value at about 0.310 ampere. The resistance then skyrockets to a value which depends on the extent to which the greatly increased resistance of the element limits the current. It is found experimentally that if when the element is on curve CD it is lowered into the liquid it will return to curve OA only when its resistance is less than a critical value of the order of 6.0 ohms. Since it can always be returned to curve OA by reducing to zero the current passing through it, in the use of such elements the circuit is so arranged as to be opened automatically when a voltage rise appears across the element. Thus only if the gauge is in the liquid is a negligible voltage signal obtained.

From the foregoing, it may be construed that elements having the smallest residual resistivities will give the most robust indications of liquid level particularly for liquid helium and will also dissipate smaller amounts of power in the liquid. This is an important consideration in view of the low latent heat of vaporization of liquefied gases such as helium.

Although pure metals have been suggested for the temperature sensitive elements, other substances may be used. Electrical conducting materials having an appreciable temperature coefficient of resistance, such as certain semi-conductors, offer possibilities, especially at higher temperatures than those encountered with liquefied gases.

For higher boiling point liquids such as oxygen or nitrogen, it has been found that annealing exerts only a minor influence on the temperature coefficient of resistance and hence on the behavior of the element as a level gauge for such liquids.

Although this invention in certain of its aspects is directed primarily to principles and apparatus applicable in the measurement of the level of low boiling point liquids in containers, it will be appreciated that, in its more general aspects, this invention may be practiced in connection with liquids other than those having low boiling points and, in fact, with adequate control of the energizing current may be applied in measuring or ascertaining levels of volatile liquids. Accordingly, it is intended that the foregoing disclosure and the showings made in the drawings shall be considered only as illustrative of the principles of this invention and not construed in a limiting sense.

I claim as my invention:

1. In a device adapted for insertion into a container for determining the depth of a liquefied gas in the container, the combination of, a hollow tube of a material of low thermal conductivity, a head of electrical insulating material mounted on one end of said tube in substantially gas tight relation therewith to seal said one end of said tube, said head having an open cavity therein, a pair of terminals mounted in said head with the ends thereof projecting into said cavity and into said tube, wire filament means connected across said terminals in said cavity, a plug housing mounted on the other end of said tube in gas-tight relation therewith to seal said other end, said plug housing having a shoulder therein, a gasket seated on said shoulder, an electrical plug having a plurality of terminals mounted and sealed therein, said plug being seated on said gasket, means securing said plug in said housing on said gasket, and electrical conductors connected between the terminals in said plug and the terminals in said head.

2. Apparatus as set forth in claim 1 in which each terminal in said head has two conductors connected thereto, the other ends of which conductors are connected to separate terminals in said plug.

3. In a device adapted for insertion into a container for determining the depth of a liquefied gas in the container, the combination of, a hollow tube of a material of low thermal conductivity, a head of electrical insulating material mounted on one end of said tube in substantially gas tight relation therewith to seal said one end of said tube, said head having an open cavity therein, a pair of terminals mounted in said head with the ends thereof projecting into said cavity and into said tube, wire filament means connected across said terminals in said cavity, a plug housing mounted on the other end of said tube in gas-tight relation therewith to seal said other end, said plug being seated on said gasket, means securing said plug in said housing on said gasket, a first pair of conductors connected on one end to separate terminals in said plug and on the other end to separate terminals in said head, a second pair of conductors connected on one end to separate terminals in said plug different from the terminals to which said first pair of conductors is connected and in the other end to separate terminals of said head, circuit connections including impedance means connected with the terminals of said plug to which said first pair of conductors is connected for applying electrical energy thereto to energize said wire filament, and an indicating instrument connected to the terminals of said plug to which said second pair of conductors is connected, said head being adapted for insertion into a container of liquefied gas to engage said filament with the liquefied gas.

References Cited in the file of this patent

UNITED STATES PATENTS

| Number | Name | Date |
|---|---|---|
| 2,050,128 | Schlumberger | Aug. 4, 1936 |
| 2,195,019 | Bloomheart | Mar. 29, 1940 |
| 2,361,872 | Rodgers | Oct. 31, 1944 |
| 2,398,375 | Heenam | Apr. 26, 1946 |
| 2,524,933 | Silverman | Oct. 10, 1950 |
| 2,537,246 | Thoresen | Jan. 9, 1951 |

FOREIGN PATENTS

| Number | Country | Date |
|---|---|---|
| 622,247 | France | Feb. 21, 1927 |
| 513,427 | Great Britain | Oct. 12, 1939 |

OTHER REFERENCES

"Methods of Measuring Temperature," a book by Ezer Griffiths pages 12–13, published by Charles Griffin 42 Drury Lane London, England (1947).